United States Patent Office 2,842,557
Patented July 8, 1958

2,842,557

DODECAHYDROPHENANTHRENE COMPOUNDS AND METHODS OF PREPARING THE SAME

Glen E. Arth, Cranford, George I. Poos, North Plainfield, and Lewis H. Sarett, Princeton, N. J., assignors to Merck & Co., Inc., Rahway, N. J., a corporation of New Jersey No Drawing. Application August 4, 1954
Serial No. 447,892

5 Claims. (Cl. 260—340.9)

This invention is concerned with novel polyhydrophenanthrene compounds, and processes for preparing the same; more particularly it relates to novel 4b-methyl-dodecahydrophenanthrene compounds having functional substituents at positions 1, 4 and 7 and to processes for the preparation of such compounds.

This application is a continuation-in-part of our application Serial No. 263,013, filed December 22, 1951, now abandoned, our copending application Serial No. 310,133, filed September 17, 1952, now abandoned, and our copending application Serial No. 286,808, filed May 8, 1952, now abandoned.

The novel 4b-methyl-dodecahydrophenanthrene compounds of the formula:

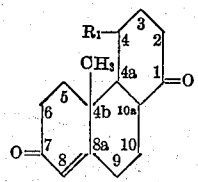

wherein $R_1$ represents a hydroxy or acyloxy group, and the 7-enol ether or ketal derivatives thereof, are useful as intermediates in the total synthesis of steroids, and in the preparation of other valuable polyhydrophenanthrene compounds. These novel compounds have three fused carbon rings corresponding to rings A, B and C of steroidal compounds and an angular methyl group at position 4b corresponding to the angular methyl group at position 10 in various steroidal compounds.

Thus, 4b-methyl-7-ethylenedioxy - 1,2,3,4,4a,4b,5,6,7,8, 10,10a-dodecahydrophenanthrene-4-ol-1-one can be converted to the valuable adrenal hormones, 11-dehydro-corticosterone and cortisone, in accordance with the following procedures:

The starting compound, 4b-methyl-7-ethylenedioxy-1,2,3,4,4a,4b,5,6,7,8,10,10a - dodecahydrophenanthrene-4-ol-1-one, is first treated to introduce a methyl substituent in position 2. This is conveniently accomplished, for example, by reacting the starting compound with methyl acetate in the presence of a suspension of sodium methoxide in benzene to form the corresponding 2-acetyl compound, intimately contacting this acetyl compound with methyl iodide in the presence of potassium carbonate to produce the corresponding 2,4b-dimethyl-2-acetyl compound, and heating this product with potassium carbonate in methanol to obtain 2,4b-dimethyl-7-ethylenedioxy-1,2,3,4,4a,4b,5,6,7,8,10,10a - dodecahydrophenanthrene-4-ol-1-one.

Upon reacting 2,4b-dimethyl-7-ethylenedioxy-1,2,3,4, 4a,4b,5,6,7,8,10,10a - dodecahydrophenanthrene - 4 - ol-1-one with methallyl iodide in the presence of potassium t-butoxide the corresponding 2-methallyl derivative, M. P. 166–168° C., is produced, which on oxidation with the chromium trioxide-pyridine complex yields the corresponding 1,4-diketone, M. P. 139° C. This same diketone is also obtained by reacting 2,4b-dimethyl-7-ethylenedioxy - 1,2,3,4,4a,4b,5,6,7,8,10,10a - dodecahydrophenanthrene-1,4-dione with methallyl iodide in the presence of potassium t-butoxide. Condensation of 2-methallyl - 2,4b - dimethyl - 7 - ethylenedioxy-1,2,3,4, 4a,4b,5,6,7,8,10,10a - dodecahydrophenanthrene - 1,4-dione with ethoxyacetylene magnesium bromide yields 2,4b - dimethyl - 2 - methallyl - 1 - ethoxyethinyl - 7-ethylenedioxy - 1,2,3,4,4a,4b,5,6,7,8,10,10a - dodecahydrophenanthrene-1-ol-4-one, M. P. 131–132° C. When this ethoxyethinyl compound is treated with dilute sulfuric acid, 2,4b - dimethyl - 2 - methallyl - 1 - carboethoxy-methylene - 7 - ethylenedioxy - 1,2,3,4,4a,4b,5,6,7,8,10, 10a-dodecahydrophenanthrene-4-one, M. P. 94–96° C. is obtained. Upon hydrolyzing this compound with alkali the corresponding free acid, M. P. 203–205° C. is produced. Reduction of this keto acid with sodium borohydride to the 4-hydroxy acid, followed by reduction of the conjugated double bond with potassium-ammonia-isopropyl alcohol affords 2,4b-dimethyl-1-carboxymethyl-2 - methallyl - 7 - ethylenedioxy - 1,2,3,4,4a,4b,5,6,7,8, 10,10a-dodecahydrophenanthrene-4-ol, M. P. 255–257° C. Reduction of this carboxymethyl compound with lithium aluminum hydride yields the corresponding 1-(β-hydroxy-ethyl) derivative M. P. 199–201° C. and 210–211° C., which on reaction with p-toluene sulfonyl chloride in the presence of pyridine gives the 1-(β-toluene sulfonate), M. P. 157–158° C. Successive oxidations of this monotosylate derivative with the chromium trioxidepyridine complex, with osmium tetroxide with periodic acid yields 2,4b - dimethyl - 1β - (β - p - toluenesulfonyloxyethyl)-2 - acetonyl - 7 - ethylenedioxy - 1,2,3,4,4a,4b,5,6,7,8,10, 10a - dodecahydrophenanthrene - 4 - one, M. P. 105–108° C. Upon reacting this product with sodium methoxide dl - 3 - ethylenedioxy - $\Delta^5$ - 17 - pregnene - 11,20-dione, M. P. 212–214° C. is obtained which on equilibration with alkali gives the 3-ethylenedioxy derivative of dl-11-keto progesterone, M. P. 181–182.5° C. Acid hydrolysis of this product affords dl-11-ketoprogesterone. Reaction of the 3-ethylenedioxy derivative of dl-11-keto-progesterone with an oxalyl ester yields the corresponding 21-oxalyl ester compound which on hydrolysis is converted to the free acid. Resolution of the dl-21-oxalyl acid by means of the strychnine salt followed by hydrolysis of the oxalyl acid group gives 3-ethylenedioxy-$\Delta^5$-pregnene-11,20-dione, M. P. 175–176.5° C. which on hydrolysis with acid affords 11-ketoprogesterone, identical with material prepared from natural sources. Iodination and acetoxylation of the 21-oxalyl acid of 3-ethylenedioxy-$\Delta^5$-pregnene-11,20-dione obtained as described above yields successively crystalline 3-ethylenedioxy-21-iodo-$\Delta^5$-pregnene-11,20-dione and 3 - ethylenedioxy-$\Delta^5$-pregnene-21-ol-11,20-dione acetate, M. P. 193.5–194° C. Acid hydrolysis of this latter compound yields 11-dehydrocorticosterone identical with the product obtained from natural sources. Conversion of the 3-ethylenedioxy-$\Delta^5$-pregnene-21-ol-11,20-dione acetate to the 20 cyanhydrin, M. P. dec. 220–224° C., and dehydration of this product gives the $\Delta^{5,17}$-20-cyanopregnadiene, M. P. 203° C. which on oxidation with potassium permanganate yields 3-ethylenedioxy-$\Delta^5$-pregnene-17,21-diol-11,20 dione acetate, dec. 262–267° C. Acid hydrolysis of the latter compound yielded cortisone acetate. These reactions are described in the publication entitled "Stereospecific total synthesis of cortisone" which appeared in the Journal of the American Chemical Society, volume 74, pages 4974–4975.

It is an object of our invention to provide new 4b-methyl-dodecahydrophenanthrene-4-ol-1-one compounds having a functional group in the 7 position. It is a further object to provide processes for preparing these new compounds from 4b-methyl-1,2,3,4,4a,4b,5,6,7,9,10,10a- dodecahydrophenanthrene-1,4-diol-7-one (I). Other objects will be apparent from the detailed description hereinafter provided.

In accordance with one embodiment of our invention, we have found that our novel compounds can be prepared from compound I by the following reactions:

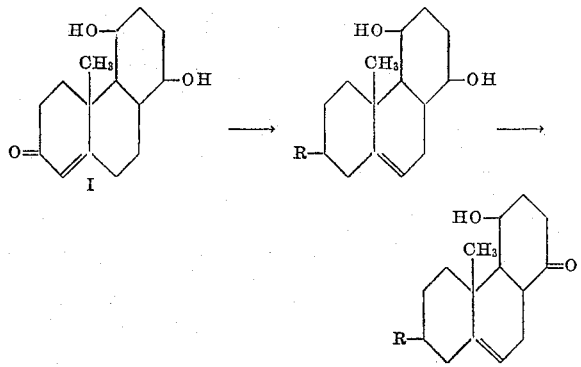

wherein R represents a substituent convertible to a keto group by hydrolysis.

In this process the starting material, compound I, is first reacted with a suitable reagent to block or protect the 7-keto substituent, for example, by forming an enol ether or ketal derivative, and this derivative is then oxidized to convert the 1-hydroxy group to a keto group.

Thus, enol ether derivatives of the formula

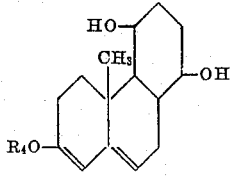

wherein $R_4$ is a hydrocarbon radical, are suitable starting materials in our process. The methyl and ethyl enol ethers which are readily prepared are particularly suitable as starting materials. Cyclic ketal derivatives, such as the 7-ethylenedioxy derivative of the formula

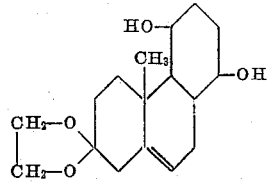

the corresponding monothio ketal derivative of the formula

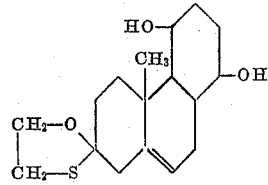

and the corresponding dithioketal derivatives of the formula

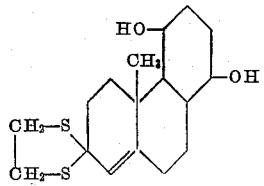

are also useful in the present invention. Similarly, other cyclic ketal derivatives such as the trimethylene, propylene, and butylene ketals, can be used to protect the 7-keto substituent. Upon hydrolyzing these enol ether and ketal derivatives with acid, the protecting substituent is cleaved and the 7-keto compound having a double bond in position 8, 8a is obtained.

Although, as indicated above, the 7-keto group of the starting compound can be protected or blocked by forming an enol ether or ketal derivative, we have found it most convenient to protect the 7-keto substituent by converting it to a ketal group, preferably a cyclic ketal such as the ethylenedioxy derivative. In the preparation of the ketal derivative, the double bond shifts from the 8, 8a position to the 8a, 9 position. On hydrolysis of the ketal derivative to the 7-keto compound the double bond again shifts and returns to the 8, 8a position. Thus, 4b-methyl - 1,2,3,4,4a,4b,5,6,7,9,10,10a - dodecahydrophenanthrene-4-ol-1,7-dione (VII) is conveniently prepared by the following reactions.

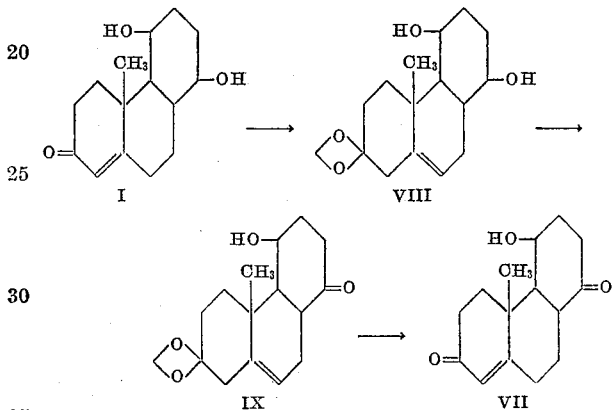

In the first step of this process, compound I is converted to the corresponding 7-ethylenedioxy derivative, namely, 4b-methyl-7-ethylenedioxy-1,2,3,4,4a,4b,5,6,7,8,10,10a-dodecahydrophenanthrene-1,4-diol (VIII). This derivative is readily prepared by heating compound I with glycol in the presence of an acid catalyst such as p-toluene sulfonic acid. The reaction is preferably carried out in a suitable inert solvent medium, for example ethylene dichloride. The reaction is conveniently effected by heating the mixture of compound I, glycol, ethylene dichloride and p-toluene sulfonic acid and distilling off the water of reaction formed as an ethylene dichloride azeotrope. Upon completion of the reaction, the ethylenedioxy derivative of I is recovered by evaporating the solution and crystallizing the product from a suitable solvent such as acetone.

In the second step of this process, the ethylenedioxy-derivative of I is selectively oxidized to convert the 1-hydroxy substituent to a keto group. While other oxidation procedures for effecting this oxidation can also be used, we presently prefer to carry out this reaction by reacting compound VIII with a metal alkoxide in the presence of a suitable ketone. In general, we find that the reaction is most readily carried out in the presence of a suitable inert organic solvent (inter alia benzene, toluene, dioxane, and the like). Thus, the reaction is effected by dissolving compound VIII in a mixture of a ketone and the inert organic solvent, adding a metal alkoxide thereto and warming the reaction mixture. Suitable ketones which may be used in this reaction include acetone, methyl ethyl ketone, cyclohexanone, benzil and p-benzoquinone. We have found that the reaction is most conveniently carried out using cyclohexanone as the ketone, benzene as the inert solvent, and aluminum isopropoxide as the metal alkoxide.

It was indeed surprising and unexpected to find that this method could be utilized to prepare 4b-methyl-7-ethylenedioxy - 1,2,3,4,4a,4b,5,6,7,8,10,10a - dodecahydrophenanthrene-4-ol-1-one (IX) in good yields from compound VIII since it might have been anticipated that the compound would be completely oxidized to the diketo compound. Further, it was also surprising to find that in carrying out this oxidation of compound VIII, there also occurred a concurrent inversion of the configuration at C–10a, thus forming compound IX having a different B/C ring configuration than that of compound VIII.

Compound IX may also be prepared by an alternate procedure which comprises reacting a pyridine solution of VIII with pyridine-chromium trioxide complex and treating the resulting product with a base. The oxidation is effected by allowing the reaction mixture of VIII, pyridine-chromium trioxide complex and pyridine, to stand at room temperature for sufficient time to complete the oxidation. The reaction mixture is then diluted with water, and extracted with a suitable solvent such as a mixture of benzene-ether. Upon evaporating this benzene-ether extract, a mixture of oxidation products is recovered which can be separated by chromatographing the residue over alkaline alumina. Compound IX and the other oxidation products are recovered by eluting the chromatographic column with suitable solvents.

The process of oxidizing hydroxy groups to carbonyl substituents by reaction in pyridine with pyridine-chromium-trioxide complex is described and claimed in the copending application of one of us, namely, Serial No. 292,985, filed June 11, 1952.

In the last step of this process, compound IX on treatment with acids such as hydrochloric or sulfuric acid, or a substance capable of giving rise to acids, such as p-toluene sulfonyl chloride, is converted to the corresponding 7-keto compound, namely, compound VII.

Alternatively, it is now found that compound VII can also be obtained by reacting compound I with N-bromoacetamide, and treating the resulting product with a base. This process is readily effected by dissolving compound I in pyridine, adding N-bromoacetamide to the resulting solution and permitting the reaction mixture to stand at room temperature for several hours. The reaction mixture is then cooled and poured into an excess of hydrochloric acid. The hydrochloric acid solution is extracted with a suitable solvent such as chloroform and the chloroform extracts evaporated to dryness. Compound VII is then conveniently recovered by chromatographing the residue so obtained over alkaline alumina and eluting the product with an ether-chloroform solvent mixture.

In accordance with another embodiment of our invention, compound VII can also be prepared from compound I by the following alternative method:

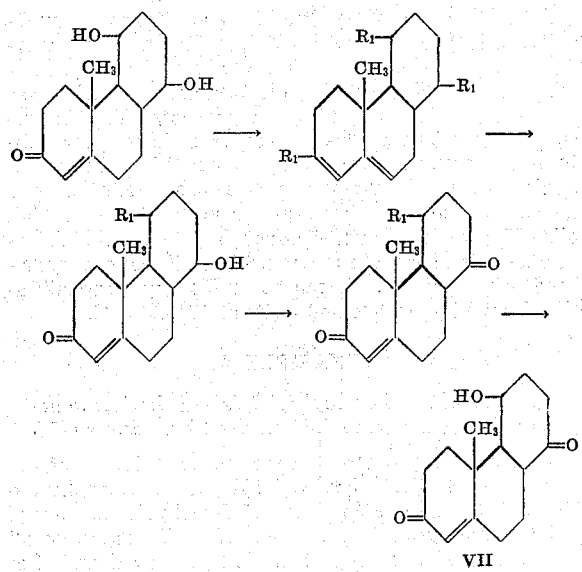

wherein $R_1$ represents an acyloxy group.

In accordance with this procedure, compound I is reacted with an acylating agent to form the triacyloxy derivative; this derivative is then selectively hydrolyzed to the 1-hydroxy-4-acyloxy-7-keto compound; this compound is then oxidized to the corresponding 4-acyloxy-1,7-diketo compound; and the latter compound is hydrolyzed to obtain compound VII.

Although, as indicated above, various acylating agents can be used to convert compound I to the corresponding triacyloxy derivative, we have found that this reaction is most conveniently effected by employing a lower aliphatic acid halide, such as acetyl chloride as the acylating agent. When acetyl chloride is used as the acylating agent, the reactions may be shown as follows:

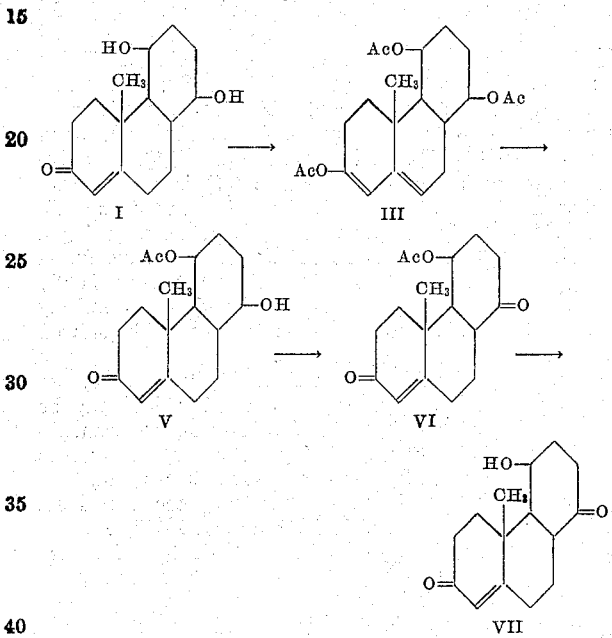

In the first step of this process, compound I is heated with acetyl chloride to form the triacetoxy derivative, 4b - methyl - 1,2,3,4,4a,4b,5,6,10,10a - decahydrophenanthrene-1,4,7-triol-1,4,7-triacetate (III). After the reaction is completed, the reaction mixture is dried in vacuo and the resulting residue chromatographed over acid washed alumina. The desired product, compound III, is recovered by eluting the alumina with a mixture of ether and petroleum ether. In addition, a small amount of 4b - methyl - 1,2,3,4,4a,4b,5,6,10,10a - decahydrophenanthrene-1,4,7-triol-1,7-diacetate (IV) is also recovered from the ether-petroleum ether eluate.

In the next step of the process compound III is selectively hydrolyzed by treatment with alkali to form 4b-methyl - 1,2,3,4,4a,4b,5,6,7,9,10,10a - dodecahydrophenanthrene-1,4-diol-7-one-4-acetate (V). This selective hydrolysis is readily effected by heating compound III with a solution of potassium carbonate in methanol for a short time. The methanol is distilled from the resulting solution while maintaining this solution below room temperature. The aqueous residue so obtained is then extracted with ether and the product, compound V, recovered by evaporating the resulting ether solution to dryness.

In the next step of this process, compound V is oxidized to 4b-methyl-1,2,3,4,4a,4b,5,6,7,9,10a-dodecahydrophenanthrene-4-ol-1,7-dione-4-acetate (VI). This reaction is readily and conveniently carried out by reacting an acetic acid solution of compound V with chromium trioxide. After the reaction is complete, water is added and the resulting solution is extracted with chloroform. The product, compound VI, can be recovered by evaporating the chloroform solution to dryness, and subjecting the resulting residue to treatment with a mild base such as chromatography over basic alumina to effect inversion at C–10a and form a compound having a different configuration at the B/C ring junction.

In the final step of this process, compound VI is hydrolyzed to obtain compound VII. This reaction is effected by refluxing a solution of compound VI with an alkali such as methanolic potassium hydroxide. The product, VII, is recovered by extracting the resulting reaction mixture with a suitable solvent such as benzene, and evaporating the solvent extracts to dryness.

Pursuant to a further embodiment of our invention, we have found that compound IX can be reduced by reaction with suitable reducing agents to obtain compound XII, a stereoisomeric form of compound VIII. This new compound, 4b-methyl-7-ethylenedioxy-1,2,3,- 4,4a,4b,5,6,7,8,10,10a - dodecahydrophenanthrene - 1,4-diol (XII), has a different configuration at the B/C ring junction than that of compound VIII. Compound XII has a melting point of about 175–176° C. while compound VIII melts at about 189° C. Similarly, when 4b - methyl-7-ethylenedioxy-1,2,3,4,4a,4b,5,6,7,8,10,10a-dodecahydrophenanthrene-1,4-dione (X) is reduced, another stereoisomeric modification of compounds VIII and XII, namely compound XIII, is obtained having a melting point of about 198–198.5° C. We have found that compounds XII and XIII are most conveniently prepared by reacting compound IX and X respectively with lithium aluminum hydride in a suitable solvent medium such as tetrahydrofuran.

Compound I utilized as the starting material in the present invention, is a new compound which may be prepared by reacting 5-methyl-6-keto-perhydronaphthalene-1,4-diol with methyl vinyl ketone in the presence of an alkaline condensing agent, such as a strong base (inter alia an alkali metal hydroxide and the like). This process is described in U. S. Patent 2,617,828.

The 5-methyl-6-keto-perhydronaphthalene-1,4-diol used as the starting material in the preparation of compound I is prepared as follows:

β-Ethoxy-propionaldehyde is reacted with ethyl magnesium bromide to produce 1-ethoxy-3-hydroxy-pentane which is oxidized with chromic acid to form 1-ethoxy-3-keto-pentane; the latter compound is treated with ethyl ortho-formate and ethanol in the presence of hydrogen chloride to produce 1,3,3-triethoxy-pentane which upon reaction with hot potassium bisulfate is converted to 3-ethoxy-1,3-pentadiene; this product is then reacted with benzoquinone in accordance with the Diels-Alder condensation procedure to produce 5-methyl-6-ethoxy-1,4,4a,5,8,8a-hexahydronaphthalene-1,4-dione which on reaction with hydrogen in the presence of Raney nickel catalyst forms 5-methyl-6-ethoxy-1,2,3,4,4a,5,8,8a-octahydronaphthalene-1,4-dione; the latter product is then treated with lithium aluminum hydride to form the corresponding diol, 5-methyl-6-ethoxy-1,2,3,4,4a,5,8,8a-octahydronaphthalene-1,4-diol which is hydrolyzed to produce 5-methyl-6 - keto - perhydronaphthalene - 1,4 - diol. These reactions are described in detail in a copending application of one of the present applicants Serial No. 216,109, filed March 16, 1951, now abandoned.

The following examples are presented as illustrative of our invention:

EXAMPLE 1

*Preparation of 4b-methyl-7-ethylenedioxy-1,2,3,4,4a,4b,- 5,6,7,8,10,10a - dodecahydrophenanthrene - 1,4 diol (VIII)*

Into a 5 liter flask equipped with a stirrer, a 1 liter dropping funnel and a sidearm with condensor attached in distilling position, were placed 38.9 g. (0.155 mole) of 4b -methyl-1,2,3,4,4a,4b,5,6,7,9,10,10a-dodecahydrophenanthrene-1,4-diol-7-one (I). 40 cc. (0.645 mole) of glycol, 2,500 cc. of ethylene dichloride and 9.4 g. (0.992 mole) of p-toluene-sulfonic acid. This mixture was set stirring. Enough heat was applied to distill off 3 liters of the azeotrope of the solvent and water, formed as a by-product, during a 3-hour period. During this time an additional 1,500 cc. of ethylene dichloride was added to keep the reactants in solution. After 3 hours the reaction mixture was cooled and thoroughly shaken with 50 cc. of an aqueous 1 normal potassium bicarbonate solution. The aqueous carbonate layer was drawn off and twice extracted with ethylene dichloride. All three ethylene dichloride extracts were then combined, dried over anhydrous magnesium sulfate and concentrated. This concentrate was taken up in 1 liter of acetone and concentrated until crystals just began to come out. Filtration of the cold acetone gives the crude crystalline product 4b - methyl - 7-ethylenedioxy-1,2,3,4,4a,4b,5,6,7,8,10, 10a-dodecahydrophenanthrene-1,4-diol which can be further purified by recrystallization from acetone. The pure product melts at 189.° C.

EXAMPLE 2

*Preparation of 4b-methyl-7-ethylenedioxy-1,2,3,4,4a,4b,5,- 6,7,8,10,10a - dodecahydrophenanthrene - 4 - ol - 1-one (IX) and 4b-methyl-7-ethylenedioxy-1,2,3,4,4a,4b,- 5,6,7,8,10,10a-dodecahydrophenanthrene-1,4-dione (X)*

Eighty-six and five tenths grams (0.294 mole) of 4b-methyl - 7 - ethylenedioxy - 1,2,3,4,4a,4b,5,6,7,8,10,10a-dodecahydrophenanthrene-1,4-diol was dissolved in 2,130 g. (2,250 cc.) (21.7 moles) of cyclohexanone, and 2,250 cc. of benzene. To this solution was added 86.5 g. (0.424 mole) of aluminum isopropoxide, and the whole was then set to reflux for 12 hours. At the end of this time 25 cc. of water was added. The coagulated aluminum hydroxide thus formed was filtered off. The filtrate was concentrated and dried in vacuo, leaving a residue which, on trituration with petroleum ether, gave the crude crystalline product 4b-methyl-7-ethylenedioxy-1,2,3,4,4a,4b,5,6,7,8,- 10,10a-dodecahydrophenanthrene-4-ol-1-one. It can be purified by recrystallization from acetone and melts at 219–220° C.

The petroleum ether washes, used in the trituration, contain the product 4b-methyl-7-ethylenedioxy-1,2,3,4,4a,- 4b,5,6,7,8,10,10a-dodecahydrophenanthrene-1,4-dione. It can be purified by recrystallization from ether and melts at 120° C.

EXAMPLE 3

*Preparation of 4b-methyl-1,2,3,4,4a,4b,5,6,7,9,10,10a-dodecahydrophenanthrene-4-ol-1,7-dione (VII)*

A solution of 0.05 g. (0.001 mole) of 4b-methyl-7-ethylenedioxy - 1,2,3,4,4a,4b,5,6,7,8,10,10a - dodecahydrophenanthrene-4-ol-1-one in 10 cc.of methanol together with a few milligrams of p-toluenesulfonyl chloride was refluxed for 1½ hours and then concentrated. The resulting dry residue was taken up in ether, shaken thoroughly with an aqueous solution of potassium bicarbonate containing a drop of pyridine and then separated, dried over anhydrous sodium sulfate, and concentrated to a thin oil. The crude product, 4b-methyl-1,2,3,4,4a,4b,5,6,7,9,- 10,10a-dodecahydrophenanthrene-4-ol-1,7-dione, crystallized out of this oil. It can be purified by recrystallization from ethyl acetate and melts at 201–202° C.

EXAMPLE 4

*Preparation of 4b-methyl-1,2,3,4,4a,4b,5,6,10,10a-decahydrophenanthrene-1,4,7-triol-1,4,7-triacetate (III)*

In a system protected from moisture, 0.480 g. of 4b-methyl - 1,2,3,4,4a,4b,5,6,7,9,10,10a - dodecahydrophenanthrene-1,4-diol-7-one in 7 cc. of freshly-distilled acetyl chloride was refluxed for four hours. After one hour, all of the crystalline starting material had dissolved, and after four hours, the evolution of hydrogen chloride could no longer be detected. All volatile material was removed in vacuo, finally with warming under high vacuum. The residue was chromatographed over 15 g. of acid-washed alumina. With 3:7 ether-petroleum ether (30–60° C. B. P.) there was eluted crystalline triacetate, M. P. 132–6° C. After three recrystallizations from methanol, the product (III) melted at 137.5–139° C.

In addition, the 7:3 ether-petroleum ether (30–60° C. B. P.) eluate gave 4b-methyl-1,2,3,4,4a,4b,5,6,10,10a-decahydrophenanthrene - 1,4,7 - triol - 1,7 - diacetate (IV) melting at 147–150° C. Two recrystallizations from ether raised the melting point to 150–151° C.

With a shorter reaction period, the proportion of diacetate was increased.

EXAMPLE 5

*Preparation of 4b-methyl-1,2,3,4,4a,4b,5,6,7,9,10,10a-dodecahydrophenanthrene-1,4-diol-7-one-4-acetate (V)*

A solution of 0.455 g. of compound III in 25 cc. of 4% potassium carbonate in 75% methanol was refluxed for ten minutes. Methanol was distilled under aspirator vacuum with the solution kept below room temperature. The aqueous residue was extracted with five portions of ether and the ether solution was dried and concentrated. Crystallization from ether gave compound V, M. P. 156–165° C. A sample recrystallized from ether melted at 168–170° C.

EXAMPLE 6

*Preparation of 4b - methyl - 1,2,3,4,4a,4b,5,6,7,9,10,10a-dodecahydrophenanthrene-4-ol-1,7-dione-4-acetate (VI)*

An ice cold solution of 0.180 g. of compound V in 5 ml. of 90% acetic acid was treated portionwise with a solution of 0.18 g. of chromium trioxide in 1.8 ml. of 90% acetic acid. The reaction mixture was allowed to warm to room temperature and to stand for one hour. Three volumes of water was added and the resulting solution was extracted with six portions of chloroform. After washing with aqueous sodium bicarbonate and drying, the chloroform was distilled leaving a gummy material that could not be induced to crystallize. When chromatographed over basic alumina, the ether-chloroform (9:1) eluate contained compound VI, M. P. 103–105° C. Two recrystallizations from ether raised the melting point to 106.5–107° C.

EXAMPLE 7

*Preparation of 4b - methyl - 1,2,3,4,4a,4b,5,6,7,9,10,10a-dodecahydrophenanthrene-4-ol-1,7-dione (VII)*

Forty milligrams of compound VI in 1 cc. of benzene with 1 cc. of 1 N methanolic potassium hydroxide was heated under reflux for one hour. Benzene was added and then 1 cc. of 10% hydrochloric acid. The organic layer was separated, dried and distilled leaving a product which crystallized from acetone, M. P. 194–199° C. Recrystallization from acetone gave pure compound VII, M. P. 201–202° C.

EXAMPLE 8

*Preparation of compound VII by the N-bromoacetamide oxidation of compound I*

The solution of 0.877 g. (0.00350 mole) of compound 1 in 9 cc. of pyridine was accomplished by warming and careful cooling to room temperature to avoid crystallization. Then 0.570 g. (0.00413 mole) of pure N-bromoacetamide was added and the resulting mixture allowed to stand at room temperature for three hours. Titration at this point showed that 90% of the active bromine had been consumed. The reaction mixture was cooled and poured into excess cold 5 N hydrochloric acid. Five chloroform extractions followed by drying and concentration of the extract gave a gummy residue which on trituration with acetone yielded crystals melting at 190–225° C. Several recrystallizations of this material from methanol gave starting compound I, M. P. 241–244° C. The acetone triturate yielded a crude crystalline product, M. P. 155–185° C. By four acetone recrystallizations of this material, a small amount of compound VII, M. P. 197–199.5° C., could be obtained directly. When the crude product (M. P. 155–185° C.) was chromatographed over basic alumina, most of the material was eluted with 7:3 ether-chloroform to obtain crystals melting at 195–200° C. One recrystallization from acetone gave pure compound VII, melting point and mixed melting point with another sample of compound VII, 201–202° C.

EXAMPLE 9

*Preparation of 4b-methyl-7-ethylenedioxy-1,2,3,4,4a,4b,5,6,7,8,10,10a-dodecahydrophenanthrene-1,4-diol (XII), a stereochemical modification of compound VIII*

To one gram of lithium aluminum hydride in 25 cc. of dry tetrahydrofuran was slowly added with stirring a solution of 0.884 g. of compound IX in 25 cc. of dry tetrahydrofuran. After stirring one hour at room temperature, 4.0 cc. of water was added dropwise and the precipitated inorganic salts separated by filtration. Tetrahydrofuran was distilled leaving a crystalline residue. Recrystallization from acetone gave a first crop of XII, M. P. 175–176° C. A second crop, M. P. 160–173° C. could be obtained. The first crop after recrystallization twice from acetone was found to melt at 175–176° C.

EXAMPLE 10

*Preparation of 4b-methyl-7-ethylenedioxy-1,2,3,4,4a,4b,5,6,7,8,10,10a - dodecahydrophenanthrene - 1,4 - dione (X), 4b - methyl-7-ethylenedioxy-1,2,3,4,4a,4b,5,6,7,8,10,10a-dodecahydrophenanthrene-4-ol-1-one (IX), and 4b - methyl - 7 - ethylenedioxy - 1,2,3,4,4a,4b,5,6,7,8,10,10a-dodecahydrophenanthrene-1-ol-4-one (XVII) by the chromium trioxide-pyridine oxidation of compound VIII*

Three grams of 4b-methyl-7-ethylenedioxy-1,2,3,4,4a,4b,5,6,7,8,10,10a - dodecahydrophenanthrene - 1,4 - diol (VIII) in 30 cc. of dry pyridine was combined with 3.0 g. of chromium trioxide in 30 cc. of pyridine and allowed to stand at room temperature overnight. Dilution with water followed by extraction with benzene-ether, washing drying, concentration and vacuum drying gave 2.90 g. of crude, non-crystalline product.

When this material was chromatographed over 90 g. of alkaline alumina, the benzene eluate gave compound X, M. P. 113–118° C. With ether and ether-chloroform (1:1), there was eluted first compound IX, M. P. 216–219° C. and finally compound VII, M. P. 130–138° C.

EXAMPLE 11

*Preparation of 4b-methyl-7-ethylenedioxy-1,2,3,4,4a,4b,5,6,7,8,10,10a-dodecahydrophenanthrene-1,4-diol (XIII), a stereoisomeric form of compounds VIII and XII*

A solution of 0.180 g. of compound X in tetrahydrofuran was reduced with excess lithium aluminum hydride by the procedure described in Example 9. The product, compound XIII, melted at 198–199.5° C. After several recrystallizations from acetone.

Portions of the novel subject matter disclosed but not claimed in this application are claimed in our copending applications Serial No. 293,672, now U. S. Patent No. 2,722,532, and Serial No. 290,826, now, abandoned, filed June 14, 1952, and May 29, 1952.

Various changes and modifications may be made in carrying out the present invention without departing from the spirit and scope thereof. Insofar as these changes and modifications are within the purview of the annexed claims, they are to be considered as part of our invention.

We claim:

1. 4b - methyl -7 - ethylenedioxy - 1,2,3,4,4a,4b,5,6,7,8,10,10a-dodecahydrophenanthrene-4-ol-1-one.

2. 4b - methyl - 7 - ethylenedioxy - 1,2,3,4,4a,4b,5,6,7,8,10,10a-dodecahydrophenanthrene-1,4-diol.

3. The process which comprises reacting 4b-methyl-1,2,3,4,4a,4b,5,6,7,9,10,10a - dodecahydrophenanthrene-1,4-diol-7-one with ethylene glycol in the presence of an acid catalyst to form the 7-ethylenedioxy derivative, and reacting said derivative with aluminum isopropoxide and cyclohexane to produce 4b-methyl-7-ethylenedioxy-1,2,3,4,4a,4b,5,6,7,8,10,10a-dodecahydrophenanthrene-4-ol-1-one.

4. The process which comprises reacting 4b-methyl-7-ethylenedioxy - 1,2,3,4,4a,4b,5,6,7,8,10,10a-dodecahydrophenthrene-1,4-diol with aluminum isopropoxide and cyclohexanone to produce 4b-methyl-7-ethylenedioxy-1,2,3,4,4a,4b,5,6,7,8,10,10a - dodecahydrophenanthrene - 4 - ol-one.

5. A dodecahydrophenanthrene compound of the formula

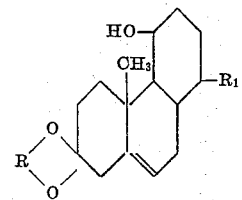

wherein R is a lower alkylene group and $R_1$ is a member from the group consisting of keto and hydroxyl.

References Cited in the file of this patent

UNITED STATES PATENTS

| | | |
|---|---|---|
| 2,617,828 | Sarett et al. | Nov. 11, 1952 |
| 2,623,885 | Miescher et al. | Dec. 30, 1952 |

OTHER REFERENCES

Romo et al.: JACS, 73, pp. 4961–64 (1951).
Sarett et al.: JACS, 74, pp. 4974–76 (1952).
Poos et al.: JACS, 75, pp. 422–29 (January 1953).